US010695838B2

(12) United States Patent
Lehto et al.

(10) Patent No.: US 10,695,838 B2
(45) Date of Patent: Jun. 30, 2020

(54) TOOL BODY, A TOOL AND A METHOD FOR MANUFACTURING A TOOL BODY (71) Applicant: SANDVIK INTELLECTUAL PROPERTY AB, Sandviken (SE)

(72) Inventors: Ralf Lehto, Gavle (SE); Per Viklund, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/080,325

(22) PCT Filed: Feb. 14, 2017

(86) PCT No.: PCT/EP2017/053267
§ 371 (c)(1),
(2) Date: Aug. 28, 2018

(87) PCT Pub. No.: WO2017/148696
PCT Pub. Date: Sep. 8, 2017

(65) Prior Publication Data
US 2019/0084047 A1 Mar. 21, 2019

(30) Foreign Application Priority Data
Feb. 29, 2016 (EP) ..................................... 16157880

(51) Int. Cl.
B23C 5/10 (2006.01)
B22F 7/06 (2006.01)
(Continued)

(52) U.S. Cl.
CPC ............... B22F 7/06 (2013.01); B22F 5/106 (2013.01); B23C 5/10 (2013.01); B22F 3/1055 (2013.01);
(Continued)

(58) Field of Classification Search
CPC . B33Y 88/00; B22F 7/06; B22F 5/106; B22F 3/1055; B22F 2005/001; B23C 5/003; B23C 2250/16
See application file for complete search history.

(56) References Cited

U.S. PATENT DOCUMENTS 9,016,988 B2 * 4/2015 Sakamaki ............... B23B 31/00
408/143
9,975,182 B2 * 5/2018 Stoyanov ................ B23B 27/14
(Continued)

FOREIGN PATENT DOCUMENTS

DE 10057295 A1 5/2002
DE 202006019940 U1 8/2007
(Continued)

Primary Examiner — Alan Snyder
(74) Attorney, Agent, or Firm — Corinne R. Gorski (57) ABSTRACT A tool body and a tool for cutting machining, wherein the tool body extends in an axial direction and at least a portion of the tool body is formed with a solid outer jacket encasing a core structure. The core structure includes a three-dimensional open lattice structure attached to the outer jacket and made of a lattice structure material. The core structure further includes a filling structure of a solid phase filling material that is different from the lattice structure material, wherein the filling structure surrounds the lattice structure. The lattice structure and the outer jacket are manufactured using additive manufacturing and the filling material is added to the lattice structure in the form of a liquid or a powder, which is thereafter solidified.

18 Claims, 5 Drawing Sheets (51) Int. Cl.
  *B22F 5/10*   (2006.01)
  *B22F 3/105*   (2006.01)
  *B22F 5/00*   (2006.01)
  *B33Y 80/00*   (2015.01)

(52) U.S. Cl.
  CPC ......... *B22F 2005/001* (2013.01); *B33Y 80/00* (2014.12); *Y02P 10/295* (2015.11)

(56) References Cited

U.S. PATENT DOCUMENTS

2014/0260506 A1   9/2014  Ciocirlan et al.
2015/0298222 A1   10/2015  Ach et al.
2016/0361765 A1*  12/2016  Danger .................... A61C 3/00

FOREIGN PATENT DOCUMENTS

EP       1563934 A1    8/2005
WO    2012084688 A1    6/2012
WO    2015090831 A1    6/2015

\* cited by examiner

TOOL BODY, A TOOL AND A METHOD FOR MANUFACTURING A TOOL BODY

RELATED APPLICATION DATA

This application is a § 371 National Stage Application of PCT International Application No. PCT/EP2017/053267 filed Feb. 14, 2017 claiming priority to EP 16157880.2 filed Feb. 29, 2016.

FIELD OF THE INVENTION

The present invention relates to a tool body of a tool for metal cutting machining, the tool body extending in an axial direction, and including at least one portion that is formed with a solid outer jacket encasing or substantially encasing a core structure, the core structure having a three-dimensional open lattice structure attached to the outer jacket and consisting of a lattice structure material, a tool for metal cutting machining having such a tool body, and to a method for manufacturing such a tool body. A tool for cutting machining can be a rotating tool such as a milling tool, a reaming tool, a boring tool, or a drilling tool, or a non-rotating tool such as a turning tool or a non-rotating drilling tool.

BACKGROUND AND PRIOR ART

Additive manufacturing, also known as 3D printing, has in recent years been used for a wide variety of applications, thereamong to manufacture tools for metal cutting machining. It basically involves processing a powdery starting material layer by layer with a laser beam, such that the individual powder particles bond to one another. Individual powder particles may for example melt with or sinter with one another layer by layer to form a solid body. This manufacturing method makes it possible to easily form complex geometrical structures in one piece, which have not been possible or realistic to achieve with previous conventional manufacturing methods.

Two different methods are commonly used in additive manufacturing: Direct Metal Deposition (DMD) and Selective Laser Melting (SLM). In DMD, a laser beam is used to form a melt pool on a metallic substrate. Metal powder is fed into the laser beam such that a fusion bonded deposit is formed on the substrate. The required geometry is built up layer by layer.

SLM is a process in which a 3D CAD model of the required geometry is first sliced into a number of finite layers. For each layer, a laser scan path is calculated, defining on one hand the boundary contour and on the other hand some form of fill sequence. Each layer is thereafter sequentially recreated by depositing powder layers, one on top of the other, and locally melting the powder layers by scanning a laser beam. The process enables complex geometries to be generatively produced in a single operation.

US 2015/0298222 discloses a tool for metal cutting machining which has been manufactured using additive manufacturing with a tool steel powder as a starting material. The tool has a tool body of which a portion is formed with a solid outer jacket encasing a core structure. The core structure comprises a three-dimensional open non-solid core structure formed in one piece with the outer jacket. In other words, the tool body is partly hollow. With such a tool body, the weight of the tool can be reduced in comparison with a solid tool manufactured using conventional manufacturing processes. However, reducing the amount of material in the tool body may also impact the strength of the tool as well as its stiffness, and thereby render it less suitable for demanding applications.

SUMMARY OF THE INVENTION

It is a primary objective of the present invention to achieve a tool for metal cutting machining which has structural and/or dynamic and/or thermodynamic advantages both with respect to a conventionally manufactured solid tool and with respect to a partly hollow tool as described above.

The primary objective is, in a first aspect of the present invention, achieved by means of the initially defined tool body, which is characterised in that said core structure further comprises a filling structure consisting of at least one solid phase filling material different from the lattice structure material, wherein said filling structure is surrounding the lattice structure. Such a tool has a core structure comprising at least two different materials, of which one forms the lattice structure and the other forms the filling structure. Preferably, one material is used as the filling material, although it is possible to use more than one filling material. The lattice structure, being attached to the surrounding outer jacket, forms a space frame of the tool body and provides a basic strength and stiffness. The solid phase filling structure, which fills in the voids in the lattice structure, provides additional strength and may be adapted such that the tool body obtains the desired properties with regard to for example damping, weight, stiffness, thermal conduction and thermal expansion. Thus, the tool body according to the invention has an improved strength in comparison with a tool body comprising a core structure in the form of a lattice structure and in which no filling structure is provided, i.e. in which empty space is provided within the core structure. At the same time, the improved strength may be achieved at a low cost in terms of additional weight, since sufficient strength can be achieved also with a relatively lightweight filling material. Thus, the tool body can be designed with a weight which is reduced in comparison with a standard, compact, solid tool body, and with a strength which is increased in comparison with a partly hollow tool body as discussed above. For applications in which the weight of the tool is of less importance, the filling material may comprise a high density material having other desirable properties. In that case, a tool body is obtained which has e.g. increased stiffness in comparison with a compact tool body made from conventional solid tool steel. An advantage with the lattice structure being surrounded by the solid phase filling structure is that the filling structure is fixed within the tool body, yet without the need for the filling structure to adhere to the lattice structure. Thus, normally incompatible materials can be combined in the core structure.

The solid outer jacket (also known as a skin in additive manufacturing) should encase at least a major part of the core structure, i.e. it should cover a major part of the core structure. For example, the solid outer jacket may cover an entire envelope surface and a front end of the tool body, while as the core structure is entirely or partly exposed at a rear end of the tool body. The solid outer jacket may preferably cover an otherwise exposed part of the core structure. If the tool is formed with only a portion of the tool body having a solid outer jacket and a core structure, the solid outer jacket may cover an envelope surface of that portion completely, while as an opening is provided in a surface which is to be joined with a surface of the remaining part of the tool body. Preferably, the outer jacket should be configured such that powder or liquid material which is later to be solidified and form the filling structure can be filled into the encased lattice structure via an opening in the solid outer jacket. The solid outer jacket may be formed with a constant wall thickness or a varying wall thickness.

The solid outer jacket and the lattice structure of the tool body, or at least the lattice structure, are preferably formed using additive manufacturing.

According to one embodiment of the invention, the lattice structure and the outer jacket are formed from the same material and in one piece. In other words, the outer jacket and the lattice structure are integrally formed from the same material. This is an efficient way of providing the lattice structure and the solid outer jacket using additive manufacturing, and it also allows formation of a strong structure.

According to one embodiment of the invention, the density of the at least one filling material is lower than the density of the lattice structure material. A tool which is lighter than a corresponding solid tool is achieved, but which is stronger and stiffer than a partly hollow tool. The reduced weight gives a tool which is easy to handle and which has desirable dynamical properties (e.g. less tendency to vibrate during operation).

According to one embodiment of the invention, the at least one filling material has a higher Young's modulus than the lattice structure material. The stiffness of the tool is thereby increased, which is desirable for most applications.

According to one embodiment of the invention, the at least one filling material is selected from the group of ceramics, metals, and cemented carbides. Such filling materials are suitable to achieve an increased stiffness of the tool. For example, ceramics such as silicon nitride and aluminium oxide are suitable filling materials which also have a lower density than tool steel, which is preferably used as a lattice structure material. Using cemented carbide as a filling material will result in a very strong and stiff tool, but at the expense of a larger density and thereby a larger weight of the tool body.

According to one embodiment of the invention, the at least one filling material is a viscoelastic material. A viscoelastic material has a viscoelastic behaviour, meaning that it returns to its original shape after any deforming force has been removed (i.e., it shows an elastic response) even though it takes time to do so (i.e., it has a viscous component to the response). By using a viscoelastic filling material, the damping properties of the tool can be improved in comparison with both a conventionally produced solid tool and with a partly hollow tool. Suitable materials are e.g. rubber, synthetic rubber, and silicone.

According to one embodiment of the invention, the at least one filling material is a material having a higher thermal conductivity than the lattice structure material. This is advantageous for tools intended for machining of workpieces that are sensitive to heat, since the high thermal conductivity of the tool leads to efficient heat conduction via the tool, and thereby less heating of the workpiece.

According to one embodiment of the invention, the at least one filling material is a material having a lower thermal conductivity than the lattice structure material. In this way, heat transfer into a spindle of a machine on which the tool is mounted is prevented. Thus, the tool and the machine are less affected by the heat generated during machining.

According to one embodiment of the invention, the at least one filling material is a material having a smaller thermal expansion coefficient than the lattice structure material. The total thermal expansion of the tool can thereby to some degree be reduced, so that a thermally more stable tool body is achieved. FeNi36, also known as Invar, is an example of a suitable material having a thermal expansion coefficient close to zero. It is also possible to use a filling material having a negative thermal expansion coefficient.

According to one embodiment of the invention, the lattice structure material is a metal material, preferably a tool steel. This provides the lattice structure with the desired strength and toughness.

According to one embodiment of the invention, said at least a portion of the tool body comprises a front portion of the tool body, which front portion is configured to comprise or hold a cutting part. It is often most important to be able to tailor the properties of the front portion of the tool. A rear portion can in this case, to improve cost efficiency, be made from a solid tool steel using conventional manufacturing techniques, and the front portion can be constructed separately and joined with the rear portion, or the front portion can be built directly onto the rear portion.

According to one embodiment of the invention, the core structure is only partly filled with filling material, wherein a filling factor of the core structure is for instance at least 40% or 50%, preferably at least 70%, more preferably at least 80%. In other words, in the core structure, at least 40% or 50%, preferably at least 70%, more preferably at least 80% of the space available within the lattice structure is occupied by filling material, preferably relatively homogenously distributed filling material. An even distribution of the filling material within the core structure prevents vibrations during machining.

According to one embodiment of the invention, the lattice structure is formed by a plurality of straight beams connected together at nodes such as to form a space frame. A space frame comprising straight beams forms a strong and rigid but yet light-weight lattice structure with good force absorbtion properties. The beams form struts of the space frame. Many different designs of the space frame are possible, depending on the desired properties of the tool. The space frame can be designed with the desired strength, rigidity and dynamic properties of the tool in mind. Of course, it is possible to vary the design of the space frame within the same tool, both in terms of dimension and geometry.

According to one embodiment of the invention, the space frame is constructed from a plurality of interlocking structural units, wherein the structural units are selected from tetrahedrons or octahedrons and tetrahedrons. In other words, the space frame can in this embodiment be formed either from interlocking tetrahedrons only, or from a combination of interlocking tetrahedrons and octahedrons, e.g. in a so called alternated cubic honeycomb structure. The tetrahedrons provide rigidity and strength to the lattice structure. The dimension of individual structural units within the space frame may be varied, so that e.g. structural units closer to an outer diameter of the tool body have longer beams, or struts, than a corresponding structural unit located closer to a longitudinal axis of the tool body. Since the beams extend in a plurality of different directions within the tool body, both radial and axial forces applied to the tool can be absorbed by the space frame. Furthermore, the tool has in this embodiment a high torsional stiffness and flexural strength.

According to one embodiment of the invention, the structural units are interlocking octahedrons and tetrahedrons, and each one of the octahedrons has a central square plane oriented perpendicularly to a longitudinal axis of the tool body. The octahedrons, which may be regular octahedrons, are thus oriented so that there are common nodes of neighboring octahedrons which are arranged along an axis parallel with a central longitudinal axis of rotation of the tool body. Furthermore, the octahedrons are in this embodiment also arranged so that there are octahedrons neighbouring each other in a radial direction of the tool body, having top nodes that lie in a plane parallel to said square plane.

In another aspect of the invention, the primary objective is achieved by a tool for metal cutting machining comprising the proposed tool body and at least one cutting part attached to or integrated with the tool body. The tool can be any kind of tool suitable for metal cutting machining, such as a drilling tool, a reaming tool, a boring tool, a milling tool, or a turning tool. Preferably, the tool is however a tool configured for rotary metal cutting machining, i.e. a tool having a central axis of rotation around which the tool is configured to rotate. The invention may hereby provide advantageous dynamic properties associated with a reduced weight on the tool body together with possible additional damping properties provided by the filling structure. The invention may for instance with advantage be used for reducing vibrations in connection with milling tools comprising slender tool bodies, in particular in end milling tool comprising such cylindrical tool bodies. Depending on the type of tool, different portions of the tool body may be formed with a core structure and an outer jacket. In the case of a face milling tool, it may be preferable to design the tool with a central portion provided with a core structure, and with a solid circumferential portion surrounding the central portion and holding replaceable cutting inserts. In a boring tool or a drilling tool, or a small end milling tool, it may be preferable to provide a front portion of the tool with a core structure and a solid outer jacket, and provide a solid and conventionally manufactured rear portion. The cutting parts may either be cutting edges integrated with the tool body or mounted thereon using for instance a replaceable cutting head. The tool body may also be configured for cutting inserts and fastening means such as screws, clamps or similar for attaching the cutting inserts in seats provided on the tool body.

In one embodiment of this aspect of the invention, the tool is an end milling tool, wherein the tool body is cylindrical. Such an end milling tool may e.g. exhibit improved vibration reduction in comparison with comparable tools having a conventionally manufactured compact tool body. End milling tools often have slender cylindrical tool bodies which tend to vibrate during machining. With the tool body according to the invention, having a core structure, the tendency to vibrate can be reduced if e.g. a viscoelastic filling material is selected. In particular, this is advantageous for end milling tools with small diameter.

In another aspect of the invention, the primary objective is achieved by a method for manufacturing a tool body of the proposed tool, comprising the steps:
  forming said outer jacket and said lattice structure using additive manufacturing,
  adding said at least one filling material in the form of a powder or a liquid to the lattice structure via an opening in the solid outer jacket,
  solidifying said at least one filling material.

This is a versatile way of providing a tool body according to the invention, which tool body can thereafter be machined and/or assembled with cutting parts to form a tool. By the choice of filling material, the properties of the tool can be tailored for the intended application of the tool. The step of solidifying the filling material can of course be adapted to the selected filling material.

For example, in case rubber or silicone is used, it can be solidified by means of vulcanisation. If instead a powder is used, the powder may be solidified using e.g. hot isostatic pressing (HIP) or sintering.

Further advantageous features and advantages of the invention will appear from the following detailed description.

BRIEF DESCRIPTION OF THE DRAWINGS

The invention will in the following be described by means of example with reference to the appended drawings, in which:

FIG. 4 shows a side view of the tool in FIG. 1, FIG. 5*a-b* show cross sections taken along the line V-V in FIG. 4 with and without filling structure.

DETAILED DESCRIPTION OF EMBODIMENTS OF THE INVENTION

An end milling tool 1 according to an embodiment of the invention is shown in FIGS. 1-7. The end milling tool 1 comprises an essentially cylindrical tool body 100 extending along a central axis C around which the tool 1 is rotatable in a direction R, and several cutting inserts 200 mounted in a front portion 101 of the tool body 100. Chip pockets 102 are provided rotationally ahead of the cutting inserts 200. A rear end 103 of the tool body 100 is intended to be attached to a tool holder (not shown). An envelope surface 104 extends around a periphery of the tool body 100.

Figure 1:
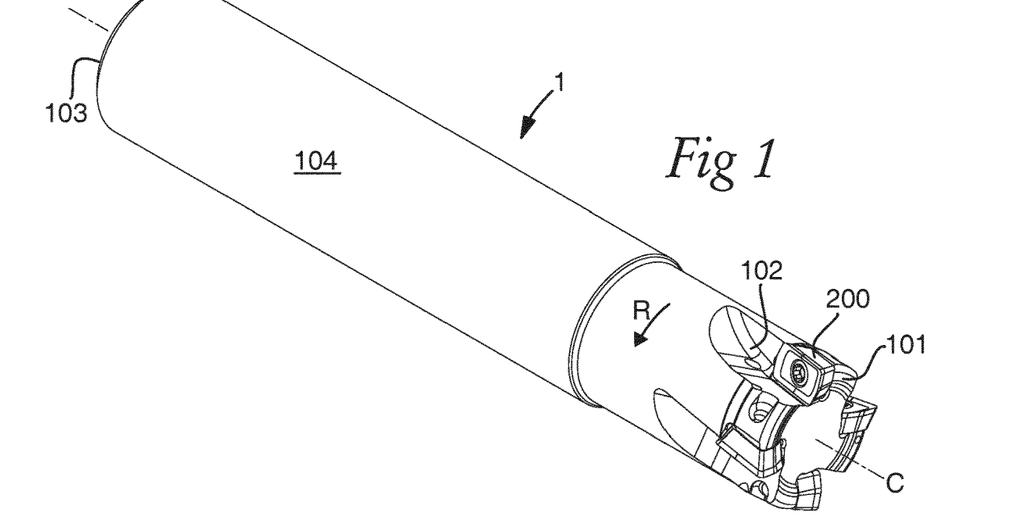
FIG. 1 shows a perspective view of a tool according to an embodiment of the invention.
Figures 2, 3:
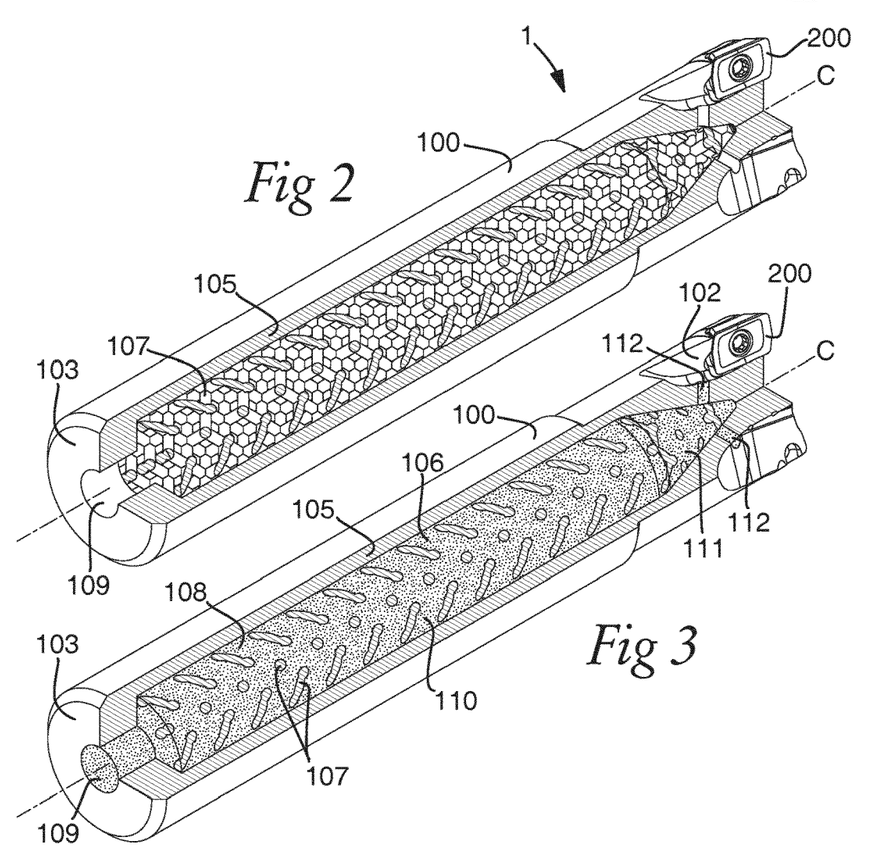
FIG. 2 shows the tool in FIG. 1 with a partially exposed lattice structure but without filling structure.
FIG. 3 shows the tool in FIG. 1 with a partially exposed core structure.
Figure 4:
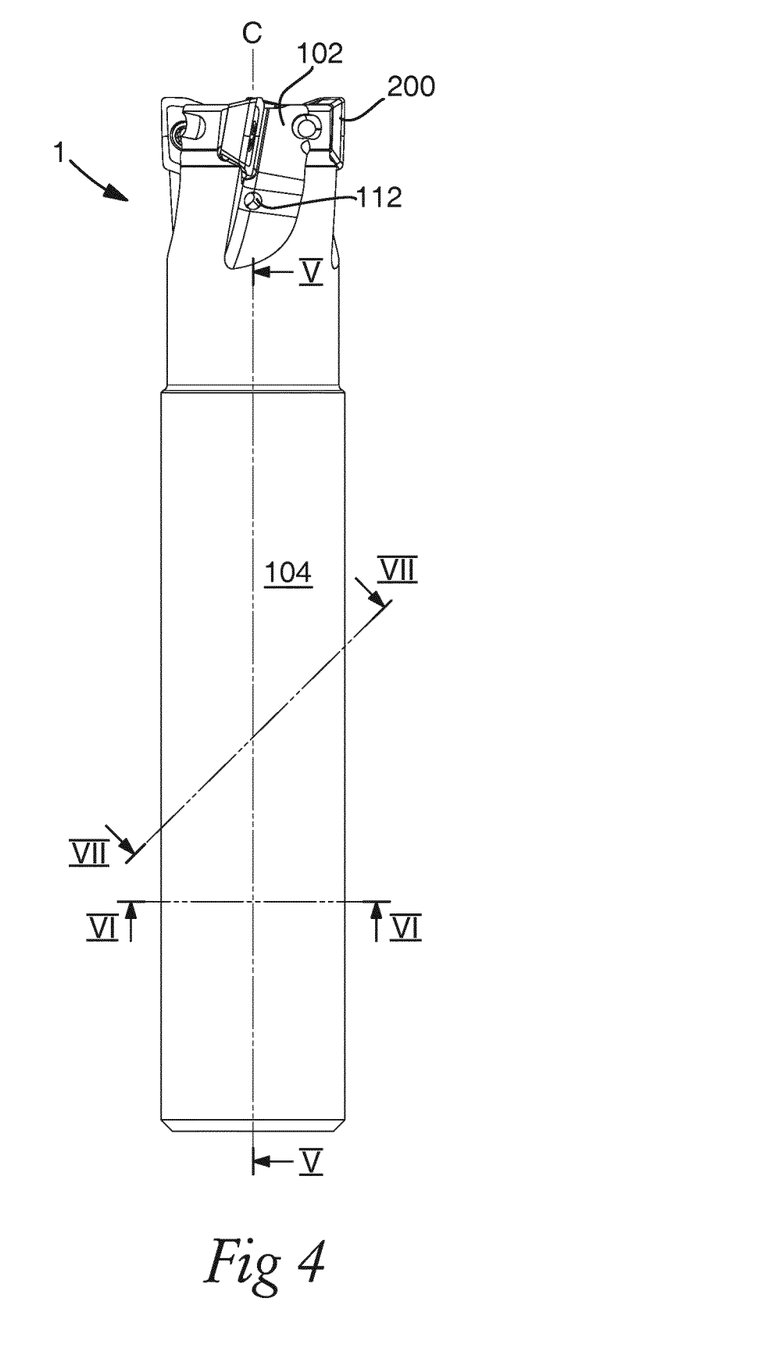

The tool body 100 is formed with a solid outer jacket 105 as shown in FIGS. 2 and 3, in which the solid outer jacket 105 has been partially cut open to show the interior of the milling tool 1. The tool body 100 comprises a core structure 106 comprising on one hand a three-dimensional open lattice structure 107, for example in the form of a space frame, and on the other hand a filling structure 108 consisting of a solid phase filling material. In FIG. 2, the tool 1 is shown without the filling structure 108, while as in FIG. 3, the filling structure 108 is added. The surrounding filling structure 108 and the lattice structure 107 are entangled, so that the filling structure 108 is immobilized with respect to the lattice structure 107. The lattice structure 107 is formed in one piece with the solid outer jacket 105. In the rear end 103 of the tool body 100, a central opening in the form of a cylindrical cavity 109 is provided in the solid outer jacket 105. The cylindrical cavity 109 may be entirely or partly filled with filling material.

The core structure 106 is in the shown embodiment pencil shaped with a long cylindrical portion 110 extending from the rear end 103 of the tool body 100 and a relatively short conical portion 111 provided in the front portion 101 of the tool body 100. From the conical portion 111, channels 112 extend to the chip pockets 102. The filling material is preferably introduced via the central opening in the rear end, whereby the channels 112 will evacuate air inside the core structure when introducing the filling material. The channels may be filled with filling material. In the shown embodiment, the solid outer jacket 105 encloses the core structure 106 entirely with the exceptions of the central opening in the rear end 103 and the channels 112.

The lattice structure 107 should be an open lattice structure, i.e. it should be possible to fill the lattice structure 107 with a liquid or powder filling material from one end of the tool body 100 to a desired filling factor. Hence, the core structure 106 may only be partly filled with filling material. The filling factor of the core structure 106 should preferably be at least 40% or 50%, preferably at least 70%, more preferably at least 80%. The filling material is preferably homogeneously distributed within the core structure 106.

The lattice structure 107 is preferably made from a lattice structure material in the form of a tool steel or another metal material, providing strength, toughness and stiffness to the tool body 100. The filling material can be selected depending on the desired properties of the tool 1. For example, the filling material can be a material having a higher Young's modulus than the lattice structure material. Such a material can be selected from the group of ceramics, metals, and cemented carbides. The filling material may also be a viscoelastic material such as rubber, synthetic rubber, or silicone. The filling material can also be a material having a higher or lower thermal conductivity than the lattice structure material, or a material having a smaller thermal expansion coefficient than the lattice structure material.

Figure 5A:
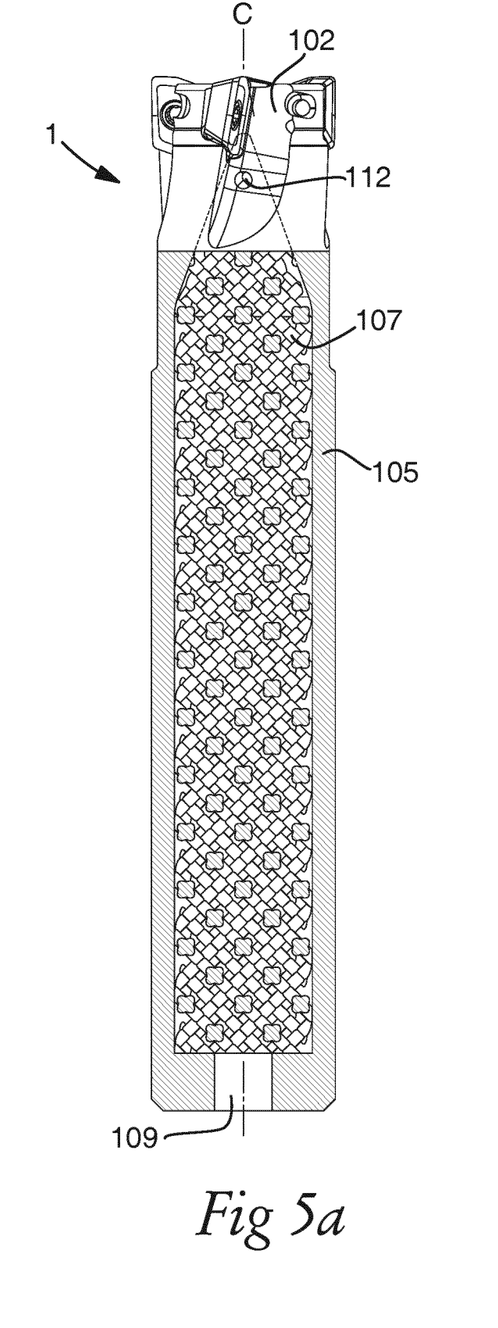
Figure 5B:
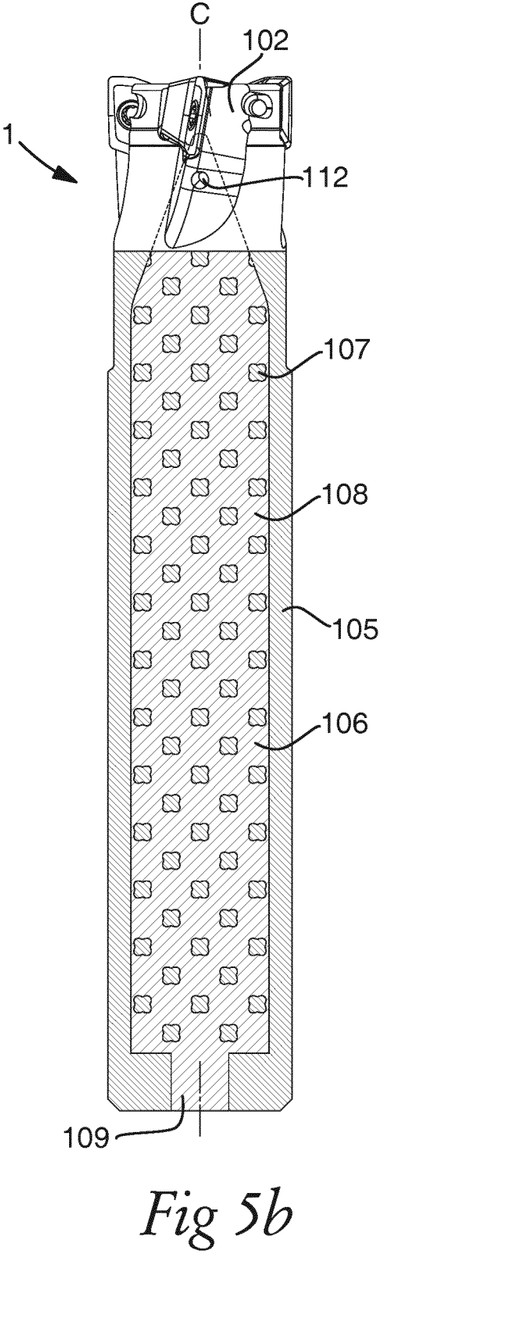
Figure 6A:
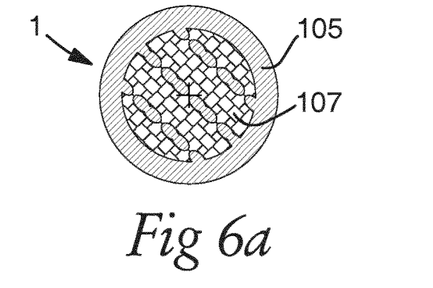
FIG. 6*a-b* show cross sections taken along the line VI-VI in FIG. 4 with and without filling structure.
Figure 6B:
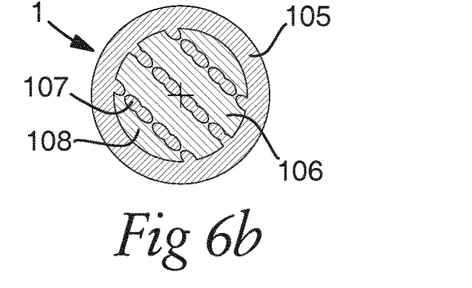
Figure 7A:
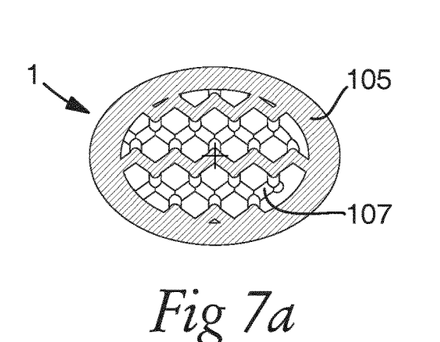
FIG. 7*a-b* show cross sections taken along the line VII-VII in FIG. 4, FIG. 8*a-c* show different views of a structural unit used to form the lattice structure of the tool shown in FIG. 1.
Figure 7B:
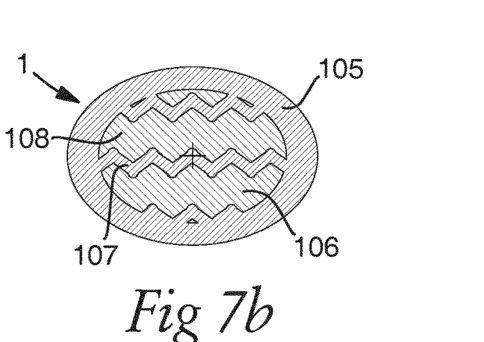
Figure 8A:
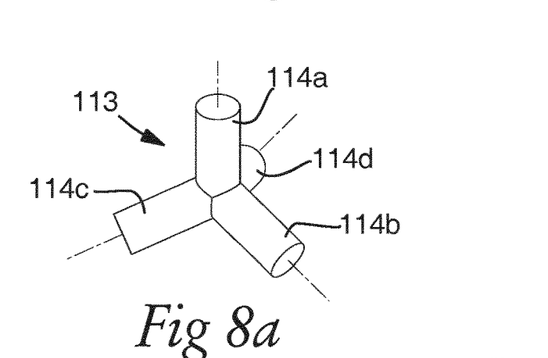
Figure 8B:
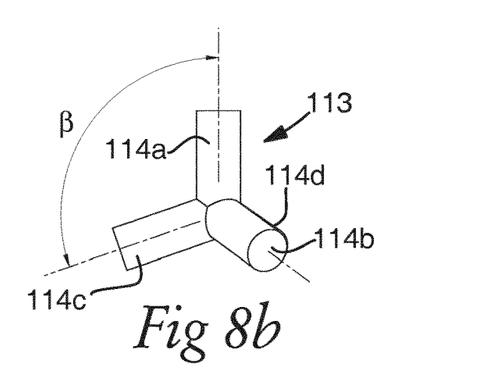
Figure 8C:
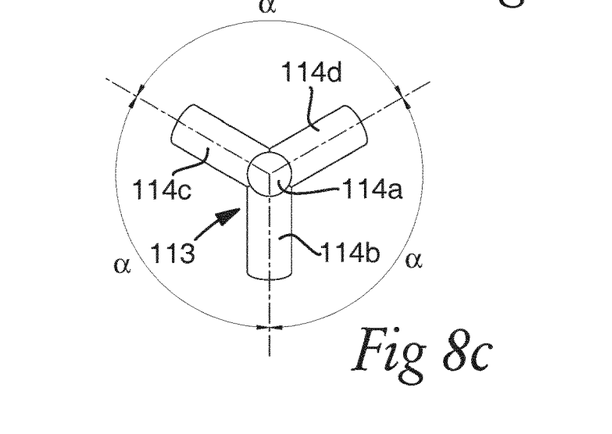
Figure 9:
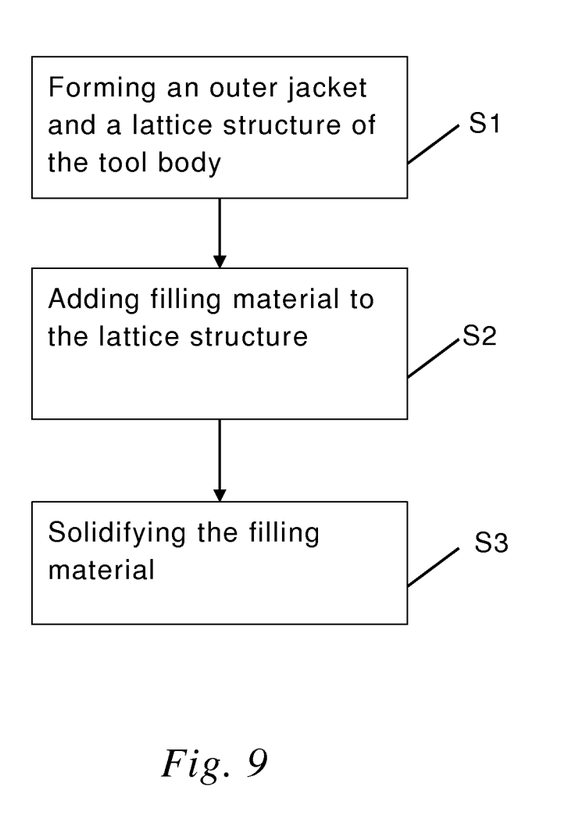
FIG. 9 is a flow chart illustrating the steps of a method according to an embodiment of the invention.

In the shown embodiment, the lattice structure 107 is construed from a structural unit 113 having four straight beams 114a, 114b, 114c, 114d of equal length extending from a common node 115 as shown in FIG. 8a-c. Hence, the shown structural unit 113 is a tetrapod-shaped structure. All the beams have circular cross sections. Three of the beams 114b, 114c, 114d are formed at an angle α of 120° with respect to one another as seen from above and projected in perpendicular plane. The fourth beam 114a is formed at an angle β of approximately 109.5° with respect to each one of the other beams 114b, 114c, 114d. Hence, the beams are mutually disposed at the angle β with respect to each other. However, the angles α, β may also differ in an assymetrical configuration. The structural elements 113 are combined together to form a three dimensional lattice. Of course, the angle that the beams 114a, 114b, 114c, 114d form with each other may be varied. In the shown embodiment, the beams 114a, 114b, 114c, 114d are oriented so that no beam is parallel to the central axis C, as can be seen in FIG. 2. The orientation as well as the length of the beams 114a, 114b, 114c, 114d are of course possible to vary. The resulting core structure 106, including the lattice structure 107 and the filling structure 108, is shown in FIGS. 5-7, wherein FIGS. 5a, 6a and 7a show the lattice structure 107 without filling structure, and wherein FIGS. 5b, 6b and 7b show both the lattice structure 107 and the filling structure 108. In the shown exemplary embodiment, the filling factor is 100%, i.e. all the space between the beams 114a, 114b, 114c, 114d is occupied by filling material.

In other embodiments, the structural unit used to form the lattice structure may be e.g. tetrahedrons, or a combination of tetrahedrons and octahedrons interlocking with each other to form a space frame. The beams may be of differing length, e.g. so that the beams are shorter close to the central axis C and longer closer to the envelope surface of the tool body. It is also possible to have a lattice structure with curved beams, or with cubic structural units, etc. The beams do not need to have circular cross sections, but any cross sectional shape is possible, such as square, elliptic, polygonal, etc.

Furthermore, different structural units may be used in different parts of the lattice structure. In one embodiment (not shown), a group of four of the beams forms a four-legged pyramid shaped structural unit. First ends of all of the beams within the structural unit are thus connected together at a node of the structural unit, from which node the beams extend in different directions. A second end of each of the beams within the structural unit is connected to a node of an adjacent structural unit.

A method for manufacturing a tool body 100 according to an embodiment of the invention is illustrated in FIG. 8. In a first step S1, the outer jacket and the lattice structure are formed in one piece using additive manufacturing. In the additive manufacturing step, a process suitable for forming three dimensional metal structures is used, such as direct metal deposition (DMD) or selective laser melting (SLM). When the outer jacket and the lattice structure have been formed, filling material in the form of a powder or a liquid is added to the lattice structure via an opening in the solid outer jacket in a step S2. In a third step S3, the filling material is solidified. The solidification process naturally depends on the selected filling material. In case of a rubber filling material, the solidification step may include vulcanisation, while as a powder filling material may be e.g. melted and fused, solidified using HIP, or sintered. After solidifying the filling material, the tool body may be machined and/or assembled with cutting parts to form a tool 1 according to the invention.

It is also possible to manufacture the lattice structure of the tool according to the invention by means of additive manufacturing, while as the outer jacket can be formed by conventional manufacturing techniques. The tool body may be formed with only a smaller portion thereof, such as the front portion, comprising a core structure, while a rear portion of the tool is formed of solid material, such as solid tool steel, without core structure.

The invention is of course not limited to the embodiments disclosed, but may be varied and modified within the scope of the following claims.

The invention claimed is:

1. A tool body of a tool for metal cutting machining, the tool body extending in an axial direction, the tool body comprising at least one portion of the tool body that is formed with a solid outer jacket encasing or substantially encasing a core structure, said core structure having a three-dimensional open lattice structure attached to the outer jacket and consisting of a lattice structure material, said core structure including a filling structure of at least one solid phase filling material that is different from the lattice structure material, wherein said filling structure surrounds the lattice structure so that the filling structure is fixed within the tool body.

2. The tool body according to claim 1, wherein the lattice structure and the outer jacket are formed from the same material and in one piece.

3. The tool body according to claim 1, wherein the at least one solid phase filling material has a higher Young's modulus than the lattice structure material.

4. The tool body according to claim 1, wherein the at least one solid phase is a viscoelastic material.

5. The tool body according to claim 1, wherein a density of the at least one solid phase filling material is lower than the density of the lattice structure material.

6. The tool body according to claim 1, wherein the at least one solid phase filling material is a material having a higher thermal conductivity than the lattice structure material.

7. The tool body according to claim 1, wherein the at least one solid phase filling material is a material having a lower thermal conductivity than the lattice structure material.

8. The tool body according to claim 1, wherein the at least one solid phase filling material is a material having a smaller thermal expansion coefficient than the lattice structure material.

9. The tool body according to claim 1, wherein the lattice structure material is a metal material.

10. The tool body according to claim 1, wherein said at least one portion of the tool body includes a front portion, the front portion being configured to include or hold a cutting part.

11. The tool body according to claim 1, wherein the core structure is only partly filled with filling material, wherein a filling factor of the core structure is at least 40%.

12. The tool body according to claim 1, wherein the lattice structure is formed by a plurality of straight beams connected together at nodes to form a space frame.

13. The tool body according to claim 12, wherein the space frame is constructed from a plurality of interlocking structural units, wherein the structural units are selected from tetrahedrons or octahedrons and tetrahedrons.

14. The tool body according to claim 13, wherein the structural units are interlocking regular octahedrons and tetrahedrons, and wherein each one of the octahedrons has a central square plane oriented perpendicularly to a longitudinal axis of the tool body.

15. A tool for metal cutting machining comprising:
a tool body according to claim 1; and
at least one cutting part attached to or integrated with the tool body.

16. The tool according to claim 15, wherein the tool is an end milling tool, and wherein the tool body is cylindrical.

17. A method for manufacturing a tool body according to claim 1, comprising the steps:
forming said outer jacket and said lattice structure using additive manufacturing;
adding said at least one solid phase filling material in the form of a powder or a liquid to the lattice structure via an opening in the solid outer jacket; and
solidifying said at least one filling material to form said filling structure of said at least one solid phase filling material different from the lattice structure material, wherein said filling structure surrounds the lattice structure so that the filling structure is fixed within the tool body.

18. The tool body according to claim 1, wherein the lattice structure material is a tool steel.

* * * * *